(12) United States Patent
Bösser et al.

(10) Patent No.: US 7,262,909 B2
(45) Date of Patent: Aug. 28, 2007

(54) ILLUMINATION APPARATUS FOR AN OPTICAL SYSTEM AND MICROSCOPE

(75) Inventors: Hans-Artur Bösser, Breidenbach (DE); Wolfgang Sulik, Waldsolms (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 156 days.

(21) Appl. No.: 10/795,470

(22) Filed: Mar. 8, 2004

(65) Prior Publication Data

US 2004/0179363 A1 Sep. 16, 2004

(30) Foreign Application Priority Data

Mar. 14, 2003 (DE) ................ 103 11 286

(51) Int. Cl.
*G02B 21/06* (2006.01)
*F21V 9/06* (2006.01)

(52) U.S. Cl. ...................... 359/385; 362/293

(58) Field of Classification Search ............... 359/368, 359/385, 389, 359, 589, 583
See application file for complete search history.

(56) References Cited

U.S. PATENT DOCUMENTS

| | | | | |
|---|---|---|---|---|
| 5,498,867 A | * | 3/1996 | Senuma et al. | 250/231.18 |
| 5,581,356 A | * | 12/1996 | Vezard | 356/418 |
| 6,624,930 B1 | * | 9/2003 | Danner et al. | 359/359 |
| 2002/0027663 A1 | * | 3/2002 | Mueller-Rentz | 356/614 |
| 2002/0085274 A1 | * | 7/2002 | Sasaki et al. | 359/385 |
| 2002/0163716 A1 | * | 11/2002 | Birk et al. | 359/385 |
| 2003/0030901 A1 | * | 2/2003 | Knebel | 359/388 |

FOREIGN PATENT DOCUMENTS

| | | | |
|---|---|---|---|
| DE | 3915421 A1 | * | 11/1990 |
| DE | 42 21 063 A1 | | 1/1994 |
| DE | 43 38 531 A1 | | 5/1995 |
| DE | 199 31 954 A1 | | 1/2001 |
| DE | 100 42 140 A1 | | 3/2002 |

* cited by examiner

*Primary Examiner*—Leonidas Boutsikaris
*Assistant Examiner*—Mark Consilvio
(74) *Attorney, Agent, or Firm*—Houston Elisseva LLP

(57) ABSTRACT

An illumination apparatus for an optical system is disclosed, the illumination apparatus (1) encompassing a single light source (2) that emits broad-band light into an illumination beam path (2*a*). Placed after the light source (2) in accordance with the present invention is a filter system (4), with which several wavelengths or wavelength regions are separable and are guided through a light-guiding means (22) to an optical system (5). The filter system possesses several reflecting filters (8*a*, 8*b*, 8*c*, 8*d*) which are arranged in such a way that a selected wavelength is guidable by way of those reflection filters and leaves the filter system (4) parallel to the illumination beam path (2*a*).

12 Claims, 2 Drawing Sheets

ILLUMINATION APPARATUS FOR AN OPTICAL SYSTEM AND MICROSCOPE

RELATED APPLICATIONS

This application claims priority of the German patent application 103 11 286.3 which is incorporated by reference herein.

FIELD OF THE INVENTION

The invention concerns an illumination apparatus for an optical system. The invention further concerns a microscope.

BACKGROUND OF THE INVENTION

Optics that are designed for different wavelengths (spectral lines such as, for example, 193 nm, 284 nm, 365 nm, and 414 nm) or wavelength regions (ultraviolet light, visible light, and infrared light) are used on an optical system (for example, a microscope). The operation of several lamp housings is necessary in order to make all the different illuminations available to the optical system. In coupling is accomplished using movable mirrors as well as notch filters and spectral filters. Special notch filters are likewise used for switchable operation between the 284-nm and 265-nm wavelengths.

German Unexamined Application DE 100 42 140 discloses an illumination and imaging device for several spectral regions. Several light sources are provided for the spectral regions necessary for measurement. The light sources are combined by means of a beam-splitter module into a single beam path. The corresponding light sources are switched depending on the desired wavelength or wavelength region. One critical disadvantage of this illumination and imaging device is that several light sources are necessary. This results in increased costs for the illumination device. Moreover, alignment is required in the event of a defective illumination device, additionally increasing service costs for the overall optical system and also for the illumination and imaging device.

German Unexamined Application DE 43 38 531 discloses an apparatus for multiple illumination of specimens. "Multiple illumination of specimens" means that measurements on the specimen are performed successively using light of different defined wavelengths. The apparatus is furthermore embodied in such a way that modulation of the light emitted by a light source of the apparatus is accomplished without mechanical resources. The intention is thus to use no mechanically movable parts, which might cause vibrations in the measurement equipment, as modulation means. The proposed apparatus has, however, the critical disadvantage that here again, several light sources are used for the multiple illumination, once again resulting in increased costs for the overall apparatus.

German Unexamined Application DE 42 21 063 discloses an optical system for incident-light fluorescence microscopy. The optical system generates, from a single light source, two or more ray bundles that can be modified independently of one another. Ray bundles of different specific wavelengths, for example from widely separated spectral regions, are filtered out of the primary light source. The ray bundles are then transferred into one another and almost entirely reflected, by a dichroic double mirror or a reflection band filter which is characterized by three or more reflection bands, into the microscope objective of an incident-light fluorescence microscope. The various excitation light bundles illuminate the same region of the specimen. The fluorescent light of different wavelengths, for example from biological cells that are stained with two or more fluorescent dyes, pass through the dichroic double mirror or the reflection band filter which has high transmissivity in the spectral regions of the fluorescent light beams, form an image of the specimen in the image plane of the microscope, and can be observed and measured. This optical system allows quantitative measurement of fluorescent light of different wavelengths and from various dyes, minimizing the effect of chromatic aberrations in the excitation light path, energy transfer between dyes, and overlaps of the dye emission spectra. The disadvantage of this proposed optical system is that although the wavelengths or wavelength regions are separated, they are then correspondingly modified and combined again for illumination of the sample in the microscope.

German Unexamined Application DE 199 31 954 discloses an illumination device for a DUV microscope. The illumination device for the DUV microscope comprises a DUV light source with which a collector is associated. Arranged after the light source and the collector is a reflecting filter system which generates a UV wavelength band and comprises four reflecting filters. For visible illumination, an additional light source is provided that can be coupled by means of a switchable mirror arrangement into the illumination beam path of the microscope or the optical system. The critical disadvantage of this apparatus is once again that more than one light source must be connected to the microscope or optical system in order to make available the greatest possible capability for variation in the illumination conditions.

SUMMARY OF THE INVENTION

It is the object of the invention to create an illumination apparatus for an optical system that optimally utilizes the light spectrum of a light source and achieves a definite reduction in costs with regard to maintenance and power consumption.

This object is achieved by way of an illumination apparatus for an optical system that comprises: a light source that emits broad-band light into an illumination beam path of the illumination apparatus; a filter system, placed after the light source, with which several wavelengths or wavelength regions are separable, wherein the filter system is arranged in such a way that all separated wavelengths or wavelength regions are available for subsequent simultaneous use in the optical system; and a plurality reflecting filters for guiding a selected wavelength such that it leaves the filter system parallel to the illumination beam path.

It is the object of the invention to create a microscope that optimally utilizes the light spectrum provided by a light source and achieves a definite reduction in costs with regard to maintenance and power consumption.

The object is achieved by a microscope that comprises: an illumination apparatus, a light source that emits broad-band light into an illumination beam path of the illumination apparatus; a filter system, placed after the light source, with which several wavelengths or wavelength regions are separable, wherein the filter system is arranged in such a way that all separated wavelengths or wavelength regions are available for subsequent simultaneous use in the optical system; and a plurality reflecting filters for guiding a selected wavelength such that it leaves the filter system parallel to the illumination beam path.

The embodiment according to the present invention of the illumination apparatus for an optical system is particularly advantageous because, with a single light source that emits broad-band light, selectively determined wavelengths or wavelength regions can be separated and can be coupled separately out of the illumination apparatus, so that a specific wavelength or wavelength region can be utilized as the user desires for illumination of a sample in the optical system. To achieve this, a filter system is arranged in the illumination apparatus in such a way that all separated wavelengths or wavelength regions are available for subsequent simultaneous or serial use in the optical system. The filter system is furthermore arranged in such a way that a selected wavelength is guidable by way of several reflecting filters, so that the wavelength leaves the filter system parallel to the illumination beam path of the illumination apparatus. The several reflecting filters for the selected wavelength comprise a first, a second, a third, and a fourth single-line notch filter. These filters are arranged in such a way that the selected wavelength leaves the filter system collinearly with the illumination beam path.

It is furthermore particularly advantageous that the several reflecting filters are configured as single-line notch filters for a wavelength of 248 nm. In addition, a further single-line notch filter is placed after the first single-line notch filter for the wavelength of 248 nm in the illumination beam path. That further single-line notch filter is configured for a wavelength of 365 nm. All the single-line notch filters used in the illumination apparatus are configured in such a way that they reflect 99% of the light of the wavelength for which they are configured, and allow the longer-wavelength light in each case to pass unhindered.

In order to maintain the adjustment or alignment of the filters, it is advantageous that the filter system is arranged in a housing. The housing is equipped with several outcoupling windows that are associated respectively with the various wavelengths or wavelength regions, so that one wavelength or one wavelength region emerges from each outcoupling window.

Further advantageous embodiments of the invention are evident from the dependent claims.

BRIEF DESCRIPTION OF THE DRAWINGS

The subject matter of the invention is depicted schematically in the drawings and will be described with reference to the Figures below, in which.

DETAILED DESCRIPTION OF THE INVENTION

Figure 1:
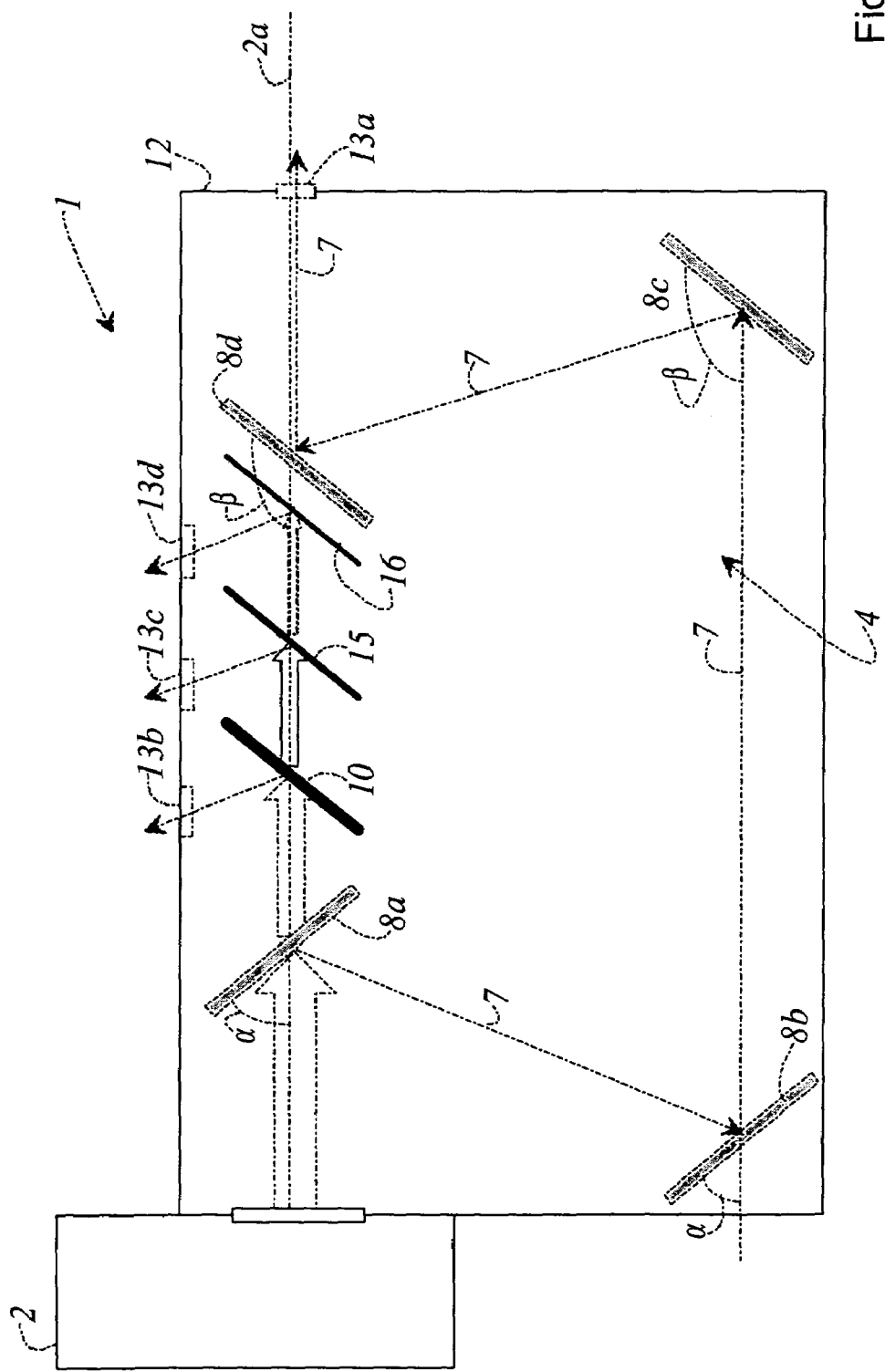
FIG. 1 schematically depicts the illumination apparatus according to the present invention.

FIG. 1 schematically depicts an illumination apparatus 1 that substantially comprises a filter system 4 and a light source 2. Filter system 4 is arranged in a housing 12. Light source 2 is flange-mounted onto housing 12 and defines an illumination beam path 2a that is depicted in FIG. 1 as a dot-dash line. The broad-band light proceeding from light source 2 firstly encounters a first reflecting filter 8a arranged in illumination beam path 2a. Reflecting filter 8a is configured as a single-line notch filter that reflects substantially 99% of the light of one wavelength and allows the remainder of the longer-wavelength light to pass. The single-line notch filter is configured for a wavelength of 248 nm. This means that these single-line notch filters reflect light of a wavelength of 248 nm and allow all light of a wavelength greater than 248 nm to pass unhindered. A second, a third, and a fourth reflecting filter 8b, 8c, 8d are associated with first reflecting filter 8a in such a way that selected wavelength 7 leaves housing 12 of filter system 4 in the direction of illumination beam path 2a. Since the single-line notch filter is configured, in the exemplary embodiment described here, for a wavelength of 248 nm, the selected wavelength thus likewise corresponds to 248 nm. It is self-evident to one skilled in the art, however, that corresponding reflecting filters having corresponding properties can be introduced into filter system 4 as the user desires. In filter system 4, first and second reflecting filters 8a, 8b are inclined at an acute angle α to illumination beam path 2a. Third and fourth reflecting filters 8c, 8d are inclined at an obtuse angle β to illumination beam path 2a, β corresponding to a value (180°−α). Second reflecting filter 8b and third reflecting filter 8c are arranged in housing 12 outside illumination beam path 2a. The light is firstly reflected out of illumination beam path 2a by first reflecting filter 8a, and strikes second reflecting filter 8b. The light is reflected by second reflecting filter 8b to third reflecting filter 8c, and from that to fourth reflecting filter 8d, so that selected wavelength 7 leaves housing 12 in the direction of illumination beam path 2a. The arrangement of four reflecting filters 8a, 8b, 8c, 8d results in particularly clean selection in terms of selected wavelength 7. Since the reflecting filters are configured as single-line notch filters, which have the property of reflecting 99% of the selected wavelength and allowing the remaining longer-wavelength light to pass unhindered, a particularly clean selection of a specific wavelength 7 is achieved here. In the present exemplary embodiment, it is the case that 99% of selected wavelength 7 (248 nm) is reflected at first reflecting filter 8a. This light still, however, contains longer-wavelength components, which are then further "cleaned" at a second reflecting filter 8b that has the same properties as first reflecting filter 8a. This process of continuing cleaning of the selected wavelength is also, logically, performed at third reflecting filter 8c and fourth reflecting filter 8d. Very good cleaning of the selected light in terms of one wavelength is therefore obtained with the arrangement of the four reflecting filters 8a, 8b, 8c, 8d. As already mentioned above, selected wavelength 7 leaves housing 12 of filter system 4, through a first outcoupling port 13a, in such a way that the light is parallel to illumination beam path 2a.

In illumination beam path 2a, a further reflecting filter 10 is arranged after first reflecting filter 8a at an obtuse angle to illumination beam path 2a. Further reflecting filter 10 is likewise configured as a single-line notch filter. This single-line notch filter is configured for a wavelength of 365 nm. The light reflected by further reflecting filter 10 leaves housing 12 through an second outcoupling port 13b. The second outcoupling port 13b defines a window which is parallel to the direction of illumination beam path 2a. Light having a wavelength above 365 nm passes through the further reflecting filter 10. This light propagates further in the direction of illumination beam path 2a inside housing 12 of filter system 4. In illumination beam path 2a, a reflector 15 for visible light is arranged after further reflecting filter 10. Reflector 15 is likewise inclined at an obtuse angle to illumination beam path 2a, and thus reflects the visible-light component still present in the illuminating light out of a third outcoupling port 13c. The third outcoupling port 13c defines a window which is parallel to the direction of illumination beam path 2a. Reflector 15 for visible light permits only the infrared component of the illuminating light to pass in the direction of illumination beam path 2a inside housing 12 of filter system 4. Arranged after reflector 15 for visible light is a mirror 16 that is configured to be qualified for infrared light. Mirror 16 is likewise inclined at an obtuse angle with respect to illumination beam path 2a, and thus reflects the remainder of the illuminating light to a fourth outcoupling port 13d. The third outcoupling port 13d defines a window which is parallel to the direction of illumination beam path 2a.

Reflecting filters 8a, 8b, 8c, 8d, as well as further reflecting filter 10, reflector 15, and mirror 16, are arranged in housing 12 of filter system 4 in such a way that the selected wavelengths each leave housing 12 of filter system 4 at different locations. A spatial separation of the wavelengths or wavelength regions is thus achieved, and they can be conveyed to a further system for processing or illumination.

Figure 2:
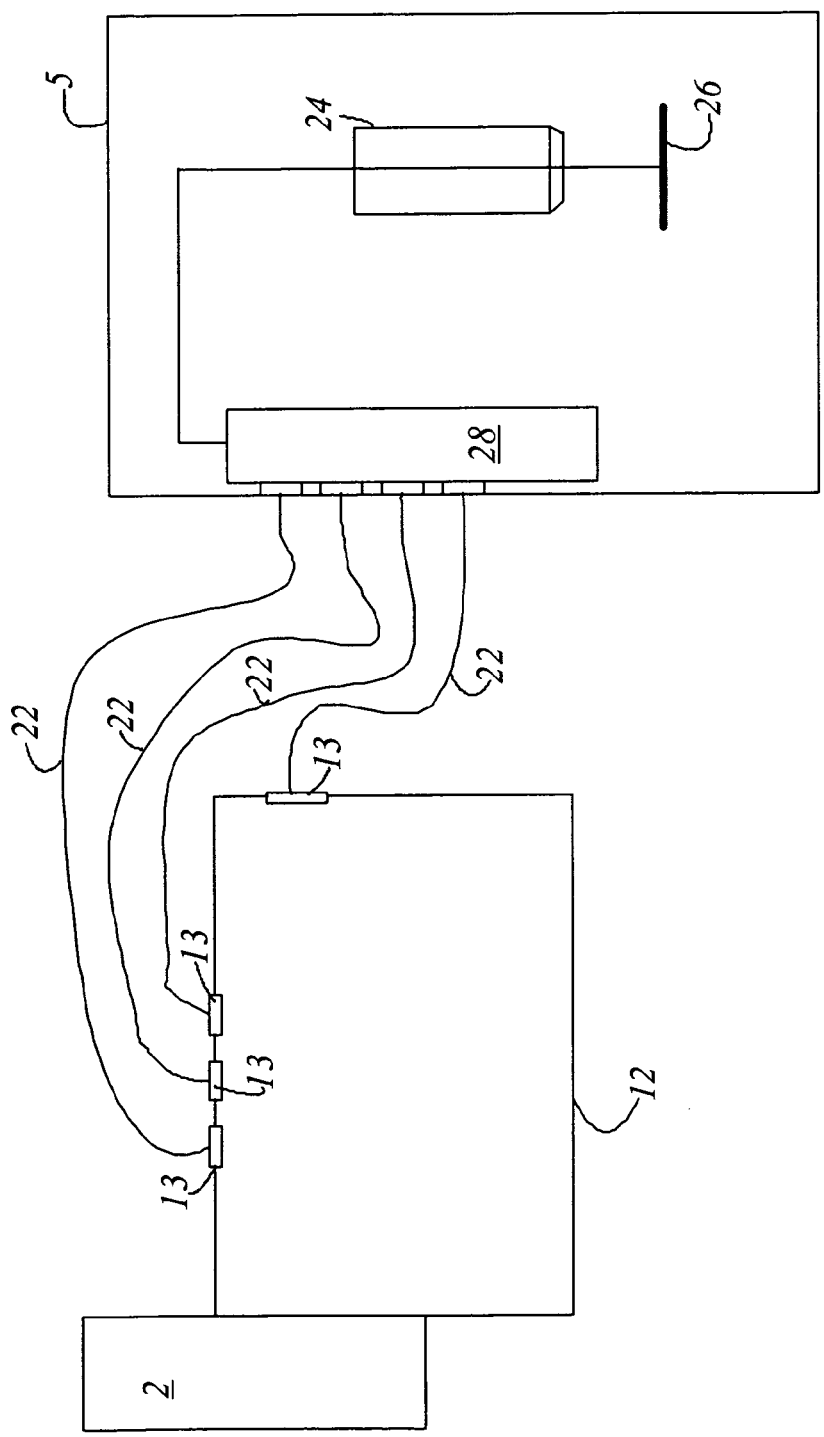
FIG. 2 schematically depicts the illumination apparatus in combination with an optical system.

FIG. 2 schematically depicts illumination apparatus 1 in combination with an optical system 5. As described in FIG. 1, in housing 12 of filter system 4 the light of light source 2 is split in corresponding fashion into wavelengths or wavelength regions, which are spatially separated from one another. Housing 12 of filter system 4 possesses several output ports 13a, 13b, 13c and 13d. From illumination apparatus 1, the light that has been spatially separated in terms of wavelengths or wavelength regions is transported from illumination apparatus 1 to optical system 5 by means of a respective light-guiding means 22. Light-guiding means 22 can be configured as a light-guiding fiber. The light-guiding means can further be implemented in the form of a mirror arrangement. Associated with optical system 5 is a combining means 28 that combines the spatially separated transported wavelengths or wavelength regions into one illumination beam path of the optical system. The combination means possesses corresponding selection means with which any desired combinations of the wavelengths or wavelength regions can be implemented for illumination of a sample 26 in the optical system. The optical system encompasses at least one microscope objective 24 with which the sample can be observed or examined. In a particularly advantageous embodiment of the invention, optical system 5 is embodied as a microscope.

What is claimed is:

1. An illumination apparatus for an optical system comprising:
    a single light source that emits broad-band light into an illumination beam path of the illumination apparatus having a housing with a plurality of outcoupling ports;
    a filter system inside the housing for filtering out a first wavelengths or wavelength regions out of the broad-band light, separating the first wavelength or wavelength region from the light in the illumination beam path and guiding the first wavelength or wavelength region, the filter system comprising a plurality of reflecting filters for guiding the first wavelength or wavelength region such that it leaves the filter system parallel to the illumination beam through a first outcoupling port in the housing; and
    at least a further reflecting filter arranged after a first reflecting filter for filtering out a second wavelength or wavelength region of a different wavelength and guiding the second wavelength or wavelength region through a second outcoupling port in the housing, wherein the first and the second wavelengths or wavelength regions are guided into the optical system for subsequent simultaneous use in the optical system, wherein the plurality of reflecting filters comprise a first, a second, a third, and a fourth single-line notch filters which are arranged in such a way that the selected wavelength leaves the filter system collinearly with the illumination beam path.

2. The illumination apparatus as defined in claim 1, wherein the plurality of reflecting filters are configured as single-line notch filters for a wavelength of 248 nm.

3. The illumination apparatus as defined in claim 2, wherein the plurality of single-line notch filters are configured in such a way that they reflect 99% of the light of the wavelength for which they are configured, and allow the longer-wavelength light in each case to pass unhindered.

4. The illumination apparatus as defined in claim 2, wherein a further single-line notch filter is placed after the first single-line notch filter for the wavelength of 248 nm in the illumination beam path.

5. The illumination apparatus as defined in claim 1, wherein the further single-line notch filter is configured for the wavelength of 365 nm.

6. The illumination apparatus as defined in claim 5, wherein the further single-line notch filter is configured in such a way that it reflects 99% of the light of the wavelength for which it is configured, and allows the longer-wavelength light in each ease to pass unhindered.

7. The illumination apparatus as defined in claim 1, wherein a selected wavelength or wavelength region is transportable from the housing of the filter system to the optical system via light-guiding means.

8. The illumination apparatus as defined in claim 7, wherein the light-guiding means for transporting the selected wavelengths or wavelength regions is configured in the form of light-guiding fibers.

9. The illumination apparatus as defined in claim 7, wherein the light-guiding means for transporting the selected wavelengths or wavelength regions is configured in the form of a mirror arrangement.

10. The illumination apparatus as defined in claim 1, wherein the optical system comprises at least one microscope objective for observation of a sample.

11. The illumination apparatus as defined in claim 1, wherein the optical system is a microscope.

12. A microscope comprising:
    an illumination apparatus coupled to an optical system;
    a single light source that emits broad-band light into an illumination beam path of the illumination apparatus having a housing with a plurality of outcoupling ports;
    a filter system inside the housing for filtering out a first wavelengths or wavelength regions out of the broad-band light, separating the firs: wavelength or wavelength region from the light in the illumination beam path and guiding the first wavelength or wavelength region, the filter system comprising a plurality of reflecting filters for guiding the first wavelength or wavelength region such that it leaves the filter system parallel to the illumination beam through a first outcoupling port in the housing; and
    at least a further reflecting filter arranged after a first reflecting filter for filtering out a second wavelength or wavelength region of a different wavelength and guiding the second wavelength or wavelength region through a second outcoupling port in the housing, wherein the first and the second wavelengths or wavelength regions are guided into the optical system for subsequent simultaneous use in the optical system, wherein the plurality of reflecting filters comprise a first, a second, a third, and a fourth single-line notch filters which are arranged in such a way that the selected wavelength leaves the filter system collinearly with the illumination beam path.

* * * * *